Oct. 26, 1926.

R. T. HOSKING

CONICAL LOCK WASHER

Filed Feb. 14, 1925

1,604,122

INVENTOR
Richard T. Hosking
BY George B. Willcox
ATTORNEY

Patented Oct. 26, 1926.

1,604,122

UNITED STATES PATENT OFFICE.

RICHARD T. HOSKING, OF WILMETTE, ILLINOIS, ASSIGNOR TO H. R. HOUGH CO., OF CHICAGO, ILLINOIS, A CORPORATION OF ILLINOIS.

CONICAL LOCK WASHER.

Application filed February 14, 1925. Serial No. 9,146.

This invention relates to an improved conical shaped lock washer for use with countersunk screws and the like. The improvement relates to the locking means, and the present application is a continuation of part of my co-pending application, Serial No. 651,797, filed July 16, 1923, in which a washer of the same type, having a modified tooth structure is described and claimed.

I provide a locking device whereby the countersunk screw head when forced tight into the conical washer acts to distort a yieldable member of the washer. The said members are twisted spring teeth or prongs that form the edges of the washer, preferably the outwardly flaring edges, although the teeth may if desired be on the inwardly flaring edges or small diameter of the conical washer. The lateral edges of the teeth near the tips of the teeth are thereby made to bite into the conical surface of the screw head and into the countersunk opening in the work, to lock the screw.

With the foregoing and certain other objects in view which will appear later in the specifications, my invention comprises the devices described and claimed and the equivalents thereof.

In the drawings, Fig. 1 is a transverse section of my improved washer.

Figure 1:
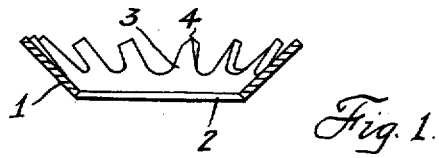
Figure 2:
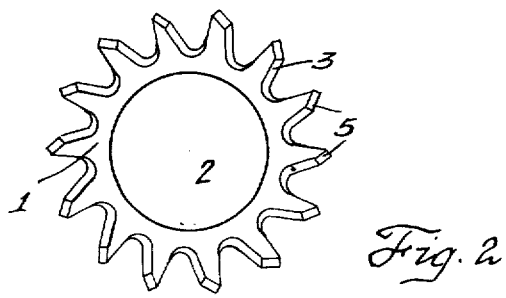
Fig. 2 is a top plan view of the same.

As is clearly shown in the drawings, the device consists in a conical sheet metal body 1 having a central aperture 2. The outer edge, being the edge at the large diameter of the conical body, is formed into a row of teeth 3 that project outwardly and upwardly; in the preferred form, as shown, the row of teeth conforming in general shape to that of the conical body.

Figure 3:
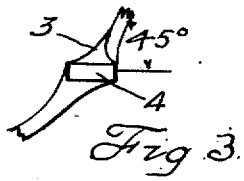
Fig. 3 is an enlarged end view of a twisted tooth.

The outer ends or tips 4 of the teeth are axially twisted to an angle of approximately forty-five degrees with their initial position as shown in Fig. 3.

The body of the tooth from its point to its root is thereby warped, the shape of the tooth at its root conforming to the cone shape of the body. Consequently the tooth at its root fits both the screw head and the countersunk hole in the work.

The tip of each twisted tooth presents, to the face of the screw head and to the work, sharp-edged prongs 5 that project respectively inwardly and outwardly from the conical inner and outer surfaces of the washer. Of the four longitudinal edges of each tooth two diagonally opposite ones will form the projecting edges just mentioned and the extremities of these edges form the sharp edged prongs referred to.

The washers are preferably made of sheet steel stamped and pressed to shape. I prefer to employ tempered clock-spring steel or equivalent material, so that the prongs are not only hard and tough, but are highly resilient. Consequently when the screw head is tightened into the washer and the prongs are slightly sprung out of their normally twisted position they will exert strong tendency to return. The prong edges tend to bite into the surface of the countersunk screw head and into the work, thereby locking the work, the screw and the washer together.

By the means above described, I have added to the usual form of plain conical washer a locking device that effectively prevents a conical-headed screw or bolt from unscrewing, even though it is subjected to extreme and long continued vibration.

Having thus described my invention, what I claim and desire to secure by Letters Patent is:

1. A lock washer comprising a centrally apertured conical body, its outer edge shaped to form a row of teeth conforming at their roots to the conical contour of said body, said teeth yieldable and axially twisted at their outer ends.

2. A lock washer comprising a centrally apertured conical body formed of stamped and pressed sheet spring metal, the outer edge of said conical body shaped to form a row of resilient teeth conforming at their roots to the conical contour of said body, and warped from their roots to their points, for the purposes set forth.

3. A lock washer comprising a centrally apertured conical body, an edge of said body shaped to form a row of teeth conforming at their roots to the conical contour of said body, said teeth axially twisted at their outer ends.

4. A lock washer comprising a substantially cone-shaped body of sheet spring metal, resilient projections formed thereon and normally extending respectively inwardly and outwardly from the cone-shaped inner and outer surfaces of the washer, for the purposes set forth.

In testimony whereof, I affix my signature.

RICHARD T. HOSKING.

apertured conical body, an edge of said body shaped to form a row of teeth conforming at their roots to the conical contour of said body, said teeth axially twisted at their outer ends.

4. A lock washer comprising a substantially cone-shaped body of sheet spring metal, resilient projections formed thereon and normally extending respectively inwardly and outwardly from the cone-shaped inner and outer surfaces of the washer, for the purposes set forth.

In testimony whereof, I affix my signature.

RICHARD T. HOSKING.

DISCLAIMER 604,122.—*Richard T. Hosking*, Wilmette, Ill. CONICAL LOCK WASHER. Patent dated October 26, 1926. Disclaimer filed September 20, 1939, by the assignee, *Illinois Tool Works*.

Hereby enters this disclaimer to claims 1, 2, 3, and 4 in said specification.
[*Official Gazette October 10, 1939.*]

DISCLAIMER 1,604,122.—*Richard T. Hosking*, Wilmette, Ill. CONICAL LOCK WASHER. Patent dated October 26, 1926. Disclaimer filed September 20, 1939, by the assignee, *Illinois Tool Works*.

Hereby enters this disclaimer to claims 1, 2, 3, and 4 in said specification.

[*Official Gazette October 10, 1939.*]